United States Patent [19]

Van Loghem et al.

[11] Patent Number: 4,485,538
[45] Date of Patent: Dec. 4, 1984

[54] BUILDING PLANKS AND APPARATUS FOR MAKING THE SAME

[76] Inventors: Johannes J. Van Loghem; Johannes La Grouw, both of Russell Rd., Rotorua, New Zealand

[21] Appl. No.: 216,507

[22] Filed: Dec. 15, 1980

Related U.S. Application Data

[62] Division of Ser. No. 967,117, Dec. 7, 1978, Pat. No. 4,285,181.

[30] Foreign Application Priority Data

Dec. 15, 1977 [NZ] New Zealand .............. 185995

[51] Int. Cl.³ .............. B21B 15/00; B21D 39/03; B23P 23/04; B23P 25/00
[52] U.S. Cl. .............. 29/33 K; 29/241; 29/433; 29/460; 264/261; 264/46.3; 264/46.5; 425/115; 425/817 C
[58] Field of Search .............. 264/261, 263, 46.2, 264/46.3, 46.5, 261, 263; 425/817 C, 115; 29/33 K, 433, 241, 460

[56] References Cited

U.S. PATENT DOCUMENTS

| | | | |
|---|---|---|---|
| 1,345,156 | 6/1920 | Flynn | 52/426 X |
| 3,099,518 | 7/1963 | Wetzler | 264/46.2 |
| 3,658,971 | 4/1972 | Schickedanz | 264/46.2 |
| 4,069,631 | 1/1978 | Nahr | 264/46.5 X |
| 4,128,369 | 12/1978 | Kemerer et al. | 425/817 C X |
| 4,178,144 | 12/1979 | Tabler | 264/46.2 X |

Primary Examiner—Charlie T. Moon
Attorney, Agent, or Firm—Holman & Stern

[57] ABSTRACT

An insulation filled building plank having two spaced apart boards held together and separated by webs having dovetail connections with the boards and being at an angle to the longitudinal axis of the plank so that any transverse cut of the plank will cut a web is produced on apparatus which first cuts matching dovetail grooves on surfaces of the boards arranged face to face after which the boards are turned to have the dovetail surfaces facing each other and the apparatus pulls dovetails of webs into the grooves in the boards from a magazine and then the apparatus fills the spaces between the webs and boards with an in situ foamable insulation.

5 Claims, 18 Drawing Figures

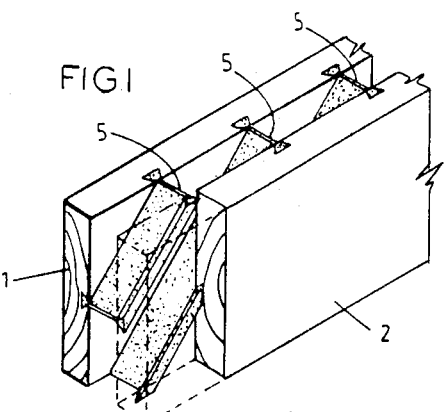
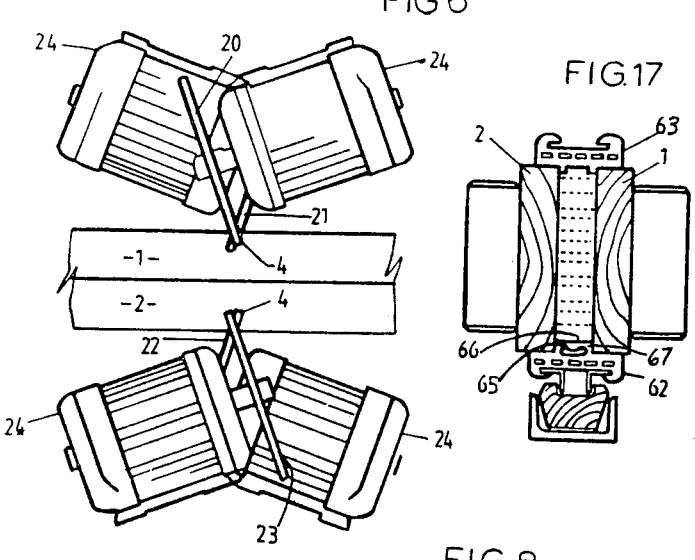
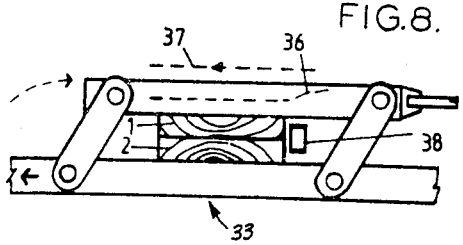

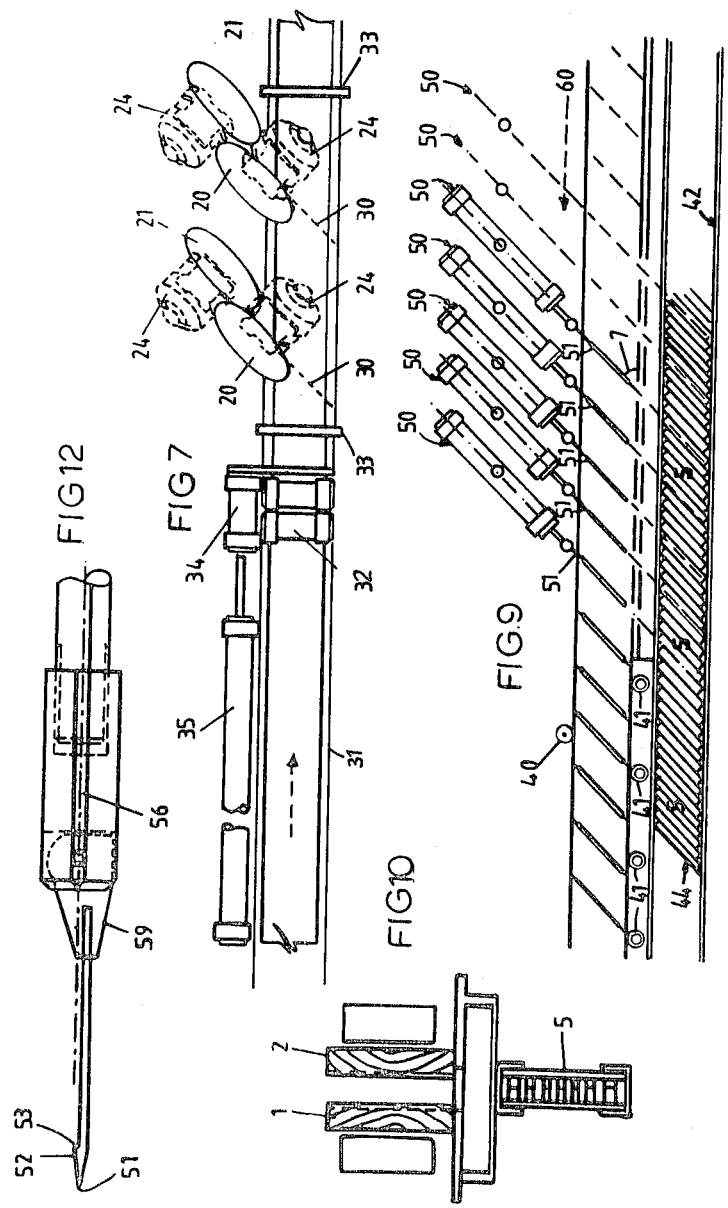

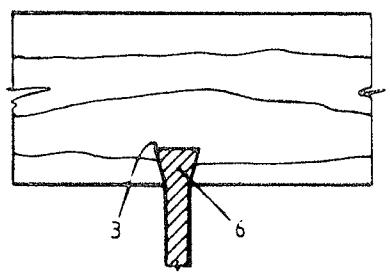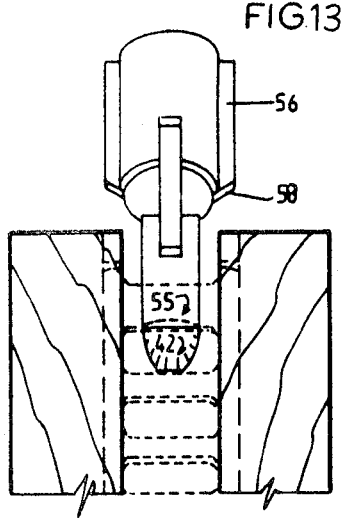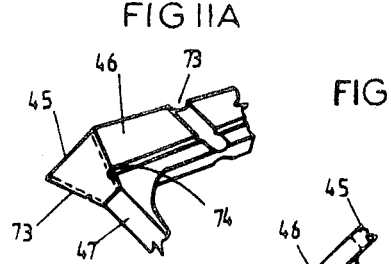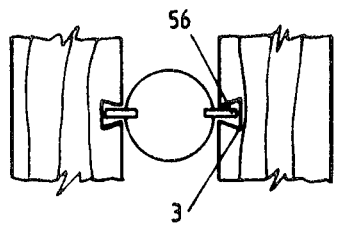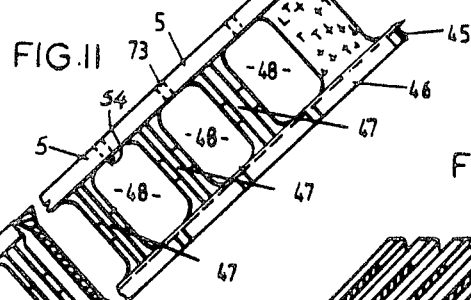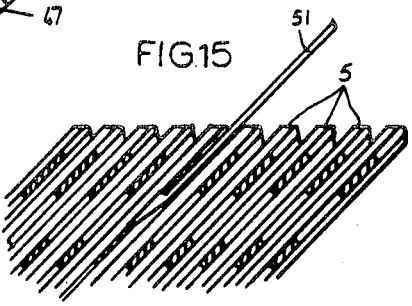

BUILDING PLANKS AND APPARATUS FOR MAKING THE SAME

This is a division of application Ser. No. 967,117, filed Dec. 7, 1978, now U.S. Pat. No. 4,285,181, issued Aug. 25, 1981.

BRIEF SUMMARY OF THE INVENTION

Field of the Invention

This invention relates to building planks and apparatus for making the same.

It is an object of the present invention to provide an apparatus for making a building plank.

Accordingly the invention is an apparatus for producing building plank comprising two spaced apart substantially parallel timber facing members, a plurality of transverse webs between said facing members, connecting means between each web end and its adjacent facing member and insulation material placed between said facing members and between said webs, said webs being arranged at an angle to the longitudinal axis of the plank so that web contact with the facing members is substantially continuous over the length of the plank, the connections to the facing members and said connecting members and webs resisting movement of said facing members relative to each other.

The apparatus comprising dovetailing means for providing dovetails in exposed surfaces of boards, the dovetails being at a suitable angle to the longitudinal axis of the boards, means to insert a plurality of webs or separators having dovetailed edges in said dovetails when said boards are arranged with the dovetailed edges facing each other and spaced apart and means to insert insulation in the spaces between the webs and the boards.

To those skilled in the art to which this invention relates many changes in construction and widely differing embodiments and applications of the invention will suggest themselves without departing from the scope of the invention as defined in the appended claims. The disclosures and the description herein are purely illustrative and are not intended to be in any sense limiting.

Brief Description of the Several Views of the Drawing

One preferred form of the invention will now be described with reference to the accompanying drawings wherein:

FIG. 1 is a perspective view of a building plank according to the invention;

FIG. 4 is an enlarged partial view of a joint between a web and a facing member of the plank shown in FIG. 1;

FIG. 6 is a schematic view of four saws arranged to produce dovetailed grooves on boards according to the invention, FIG. 7 is a schematic view showing operation of the saws to produce the dovetailed grooves, FIG. 8 is a schematic view of a clamping means used to clamp boards while the dovetail grooves are being cut;

FIG. 9 is a diagrammatic side elevation of a web inserting means according to the invention;

FIG. 10 is an end view of apparatus shown in FIG. 9,

FIG. 11 is a side elevational view of a preferred form of web according to the invention;

FIG. 11A is a perspective view of part of the web of FIG. 11;

FIG. 12 is a side elevational view of a web engaging means;

FIG. 13 is a front view of the same,

FIG. 14 is a schematic view showing the web extracting means arranged in dovetailed grooves;

FIG. 15 is an enlarged view of part of FIG. 9 showing the web inserting means in action;

FIG. 17 is an enlarged view of a conveyor belt used to retain insulation in position.

DETAILED DESCRIPTION

Figure 2:
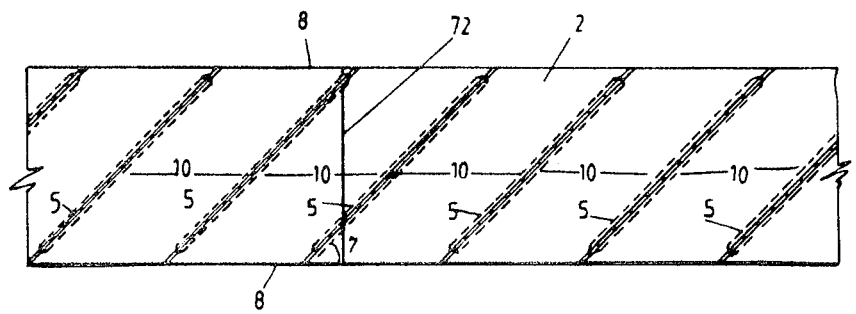
FIG. 2 is a cross-sectional elevation of the plank shown in FIG. 1 with one transverse web omitted therefrom.

In the preferred form of the invention an insulated building plank is constructed as follows. Two boards 1 and 2 are provided which may, for example, be rough sawn boards. One face of each board is machined or cut to form the female portions or grooves 4 of the timber housing joints such as a dovetail joint and may, for example, be machined to the profile shown at 3 in FIG. 4. The grooves are preferably machined in the arrangement shown in FIG. 2 i.e. in a series of parallel sloping grooves similar to groove 4 cut transversely across the face of the facing members. The two boards 1 and 2 are then arranged as shown in FIG. 1 so that the machined grooves of one board 1 align with and are faced by the machined grooves of the other board 2. A plurality of timber webs 5 are provided formed from suitable material e.g. from plywood, but preferably as a plastics molding and the edge of each web 5 is formed to the male dovetail profile 6 to fit in the female dovetail profile 3 machined in the facing members. The webs 5 are inserted by sliding into the aligned pairs of grooves 4 in the facing members so as to form a girder like structure as shown in FIG. 1 having the two boards 1 and 2 connected by the webs 5.

The angle 7 between longitudinal edge 8 and any web 5 is arranged so that any transverse cut 72 will intersect at least one web 5. This arrangement adds considerably to the strength of the plank and combined with the dovetail joints comprising grooves 4 and profile 6 materially limits relative movement due to warping or shrinking as between boards 1 and 2.

Figure 3:
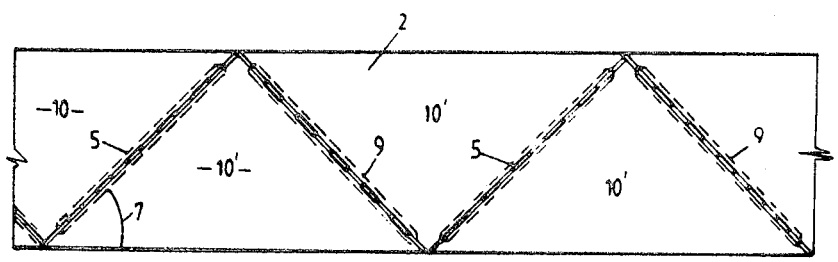
FIG. 3 is a cross-sectional elevation of an alternative form of building plank.

In an alternative construction shown in FIG. 3 the webs 5 and 9 may be disposed in zig-zag formation, the webs overlapping in a manner such as to permit insertion. This construction is likely to be stronger but more difficult to make.

An in situ foamed material is then poured in the cavities 10 formed between the facing members and between the webs so that the foamed material foams up to fill the cavities and form a heat insulation material in the core of the plank. Surplus foam which overflows the edges of the plank may, of course, be trimmed to size. Any suitable heat insulating foam may be used but it is preferred to use polyurethane foam which also acts as an excellent glue or adhesive to hold the timber facing members and webs firmly together.

Figure 5:
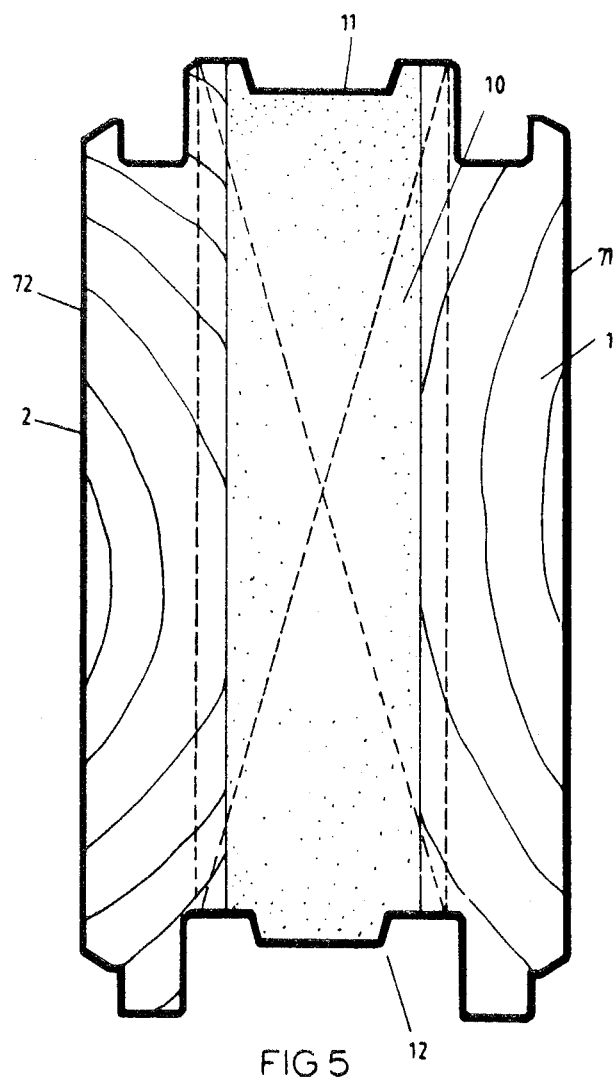
FIG. 5 is a transverse cross-sectional view of the plank shown in FIG. 1.

The edges of the plank are then formed by machining or milling to the tongue and groove type profiles 11 and 12 shown in FIG. 5 so that a plurality of planks so formed may be joined edge to edge to form a continuous structure. It is to be noted that the insulation 13 is machined to the profiles 11 and 12, but preferably the profiling of the insulation is arranged so that there is some compression of insulation as between two planks to stop or inhibit air flow through the joints.

Although the timber plank has been described in one form it will be apparent that the plank may take many other forms. For example, the webs may be arrayed in the alternative configuration shown in FIG. 3 leaving triangular cavities 10' between the webs. This form of web configuration is particularly suitable for use with an alternative form of insulation which is cut to the triangular configuration and then placed into the triangular cavities as shown.

Machining for volume production of the above plank is provided as follows.

Referring to FIG. 6 two boards 1 and 2 are clamped face to face by suitable clamping means such as those shown in FIG. 8 and means are provided to cut the grooves 4 at a suitable angle across the boards. Such means preferably comprise, for each dovetail groove, a pair of saws 20 and 21 operating on the board 1 and another pair of saws 22 and 23 operating on the board 2. These saws are arranged to remove the material of the dovetail grooves 4 as the saws are traversed across the board. A plurality of, preferably four, sets of saws are provided, each set comprising the four saws 20, 21, 22 and 23 as shown in FIG. 1 and each saw being driven by an electric motor 24 and mounted on a traversing slide shown diagrammatically at 30, FIG. 7.

In a specific example the saw cuts are made at 140 mm intervals and the four sets of saws are spaced apart at 560 mm. The saws reciprocate on slides 30 (FIG. 7) fixed to a longitudinal frame 31 and saw cuts are made in each direction of reciprocation. The boards 1, 2 on frame 31 are clamped back to back by clamp 33. Clamp 33 clamps the boards to the piston rod of ram 34. Ram 34 is fixed to piston rod of ram 35 and the rams move the boards over the frame 31 as follows. Ram 34 has a 140 mm stroke and ram 35 an 1820 mm stroke. Assume both rams 34 and 35 to be retracted. The saws are reciprocated in a first direction. Clamps 33 are released. The ram 34 is then extended 140 mm, clamps 33 re-clamped and the saws reciprocated in a second opposite direction, while the second cuts are being made clamp 32 is released, ram 34 retracted and clamp 32 re-engaged. After the second cuts are completed, clamps 33 released, the ram 34 extended a further 140 mm, clamp 33 re-clamped and the saws reciprocated in the first direction again while the saws are cutting clamp 32 is released, ram 34 retracted, and clamp 32 re-clamped. Then after the third cuts are made, clamps 33 are released, ram 34 extended 140 mm, clamps 33 re-clamped and the fourth cuts made. Clamp 32 is released, ram 34 retracted and clamps 32 re-engaged, clamp 33 released, the ram 34 extended a further 140 mm, clamp 33 released and the saws reciprocated again in the second direction. Thus, four sets of cuts have been made leaving sixteen cuts on the boards spaced at 140 mm. The clamp 33 is released, the ram 35 is extended 1820 mm carrying the boards 1 and 2 with them, the clamp 32 is released, clamp 33 clamped, the ram 35 retracted, clamp 32 clamped and the cycle recommenced. It is to be noted that 1820 mm is three sets of 560 mm spacings plus 140 mm so that the first cut in the next sequence is 140 mm from the last cut in the last sequence.

One of the clamps 32 and 33 (a greater number may be provided if desired) is shown in FIG. 8. The clamp is released by moving member 36 in the direction of the arrow 37. The boards 1 and 2 are then moved lengthwise to a stop, for example, a stop engaging the last one of the dovetail grooves which has been made as above described or a stop incorporated in ram 34 or ram 35, the board is then reclamped by moving in an opposite direction to arrow 37, the boards by the clamping movement being pressed against a side stop 38 fitted on the frame 31. The boards to form the plank have their ends squared before entering the apparatus above described and boards are fed in with such squared ends abutting so that the process is continuous across joints in the boards. After a pair of boards 1 and 2 have been operated on, the operator reverses the boards so that the dovetail sides are face to face and the previous inner faces are now the outer faces of the boards.

The boards are then placed in apparatus shown in FIGS. 9 and 10. In such apparatus the boards, of which only the board 2 may be seen in FIG. 9 and the boards 1 and 2 seen in FIG. 5, are driven by pressure rollers 40 and are supported on further rollers 41. Positioned below the rollers 41 (FIG. 9) is a magazine 42, the magazine being arranged to contain a web 5 or separator, for example, as shown in FIG. 11. The webs 5 are positioned in the magazine 42 so as to have a slope which is at the same angle as the angle of the dovetails, that is, angle 7 (FIG. 2). A pressure plate 44 is provided arranged to maintain the webs 5 (FIG. 11) in position lightly held one against the other. However, because the webs have dovetail members 46 the outer faces 45 of which are thicker than the remainder of the webs, the webs will only contact each other through the edges of the surfaces 45 leaving a space between the joining portions 47. The webs 5 are preferably made, for example, by injection molding from suitable plastics material and are provided with joining portions 47 alternating with spaces 48. As may be seen in FIG. 11A the dovetail members 46 have channels or grooves 73 and 74 in them to allow the insulation foam to penetrate under pressure between dovetail surfaces of the webs 5 and boards 1 and 2 to act as an adhesive.

To fix the webs in position in the slots web inserting means comprise a series of piston and cylinder assemblies 50 arranged at the angle 7 to the boards 2 and these piston and cylinder assemblies have draw hooks 51 shown in more detail in FIGS. 12, 13 and 14. Thus, each draw hook has a pointed member 52 and a shoulder 53, the shoulder 53 being arranged to engage an edge 54 of the web member 5. A stem 55 is fixed to a guide 56, the guide 56 fitting in the dovetail grooves 3 of the boards 1 and 2 as may be seen in FIG. 14. The guide 56 has a double bevel or tapered edge 58. Indexing means similar to those used to index the board groovings as described above are provided to index the boards 1 & 2 into position so that the draw hooks 51 may extend through spaces between adjacent webs 5 provided by edge 45 until the shoulder 53 engages behind a member 54 and an upward force is then exerted to pull the web into position between the boards 1 and 2 thus forming a plank. This is shown more clearly in FIG. 15. Again the piston and cylinder assemblies are separated by a suitable distance and the indexing is such that all the dovetails have webs inserted therein by repeated operation of the piston and cylinder assemblies with the boards 1 and 2 being moved between successive operations of the piston and cylinder assemblies 50. It is to be noted that once the webs have been pulled between the boards 1 and 2 movement of the planks in the direction of the arrow 60 (FIG. 9) results in release of the shoulder 53 from the edge 54 of a web spacer or separator 5.

Figure 16:
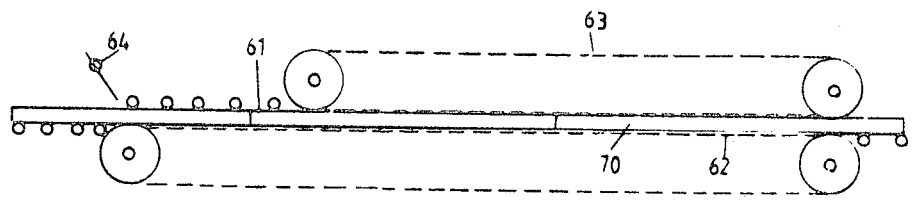
FIG. 16 is a diagrammatic side elevation of a means for providing insulation in planks according to the invention.

After the webs 5 have been inserted, the plank is moved to the apparatus shown more particularly in FIGS. 16 and 17. In FIG. 16 the boards 1 and 2 and the associated webs 5 now form a plank 61 which is moved by a suitable conveyor on an endless belt 62 and above the plank 61 is a further endless belt 63. A nozzle or pair of nozzles 64 is or are provided through which a suitable foaming insulant is provided such as a foamable urethane, the insulant being placed in the spaces 10 between the webs and the boards 1 and 2. To ensure that the insulant does not fall through, at least the lower belt 62 is in the form of a "fat" T with the stem 67 of the T having a hollow interior 65 and the stem is arranged so that it is a tight fit in the space 66 between the boards 1 and 2 so that when the boards 1 and 2 are pressed onto the belt 62 by the belt 63, the stem of the T 67 will substantially seal the bottom edges of the boards 1 and 2. Expansion of the foam takes place substantially immediately after admission through the nozzles 64, i.e. after mixing the foamable urethane and curing then occurs through the space 70 between the belts 63 and 62. Curing is substantially completed at the end of this run after which the boards have their edges dressed to the tongue and groove formation of FIG. 5 or otherwise as desired. The outer faces 71 are also dressed at this stage. It is to be noted that because of the formation of the webs onto boards 1 and 2 separations such as separation 72 will be spanned by usually one but possibly more webs depending on the angle 7 and the positioning of the cut or separation. These can be simply cut at such joints by a suitable saw. Thus, if desired, timber members forming the planks could have pieces finger jointed to each other and glued in position so that a continuous member is provided which can then be cut to length only after the end of the construction of a plank as above described.

It will be clear from the foregoing that at least in the preferred form the invention provides apparatus for providing planks which is simple to operate yet effective in use.

The invention at least in the preferred form provides the following advantages.

1. Planks according to the invention provide the advantages of an easily erected system such as that described in our U.S. Pat. No. 3,416,275 while yet providing an insulated construction. Having regard to current energy conservation programs, this is a major advantage.

2. Because of the dovetailed ends generally and the slope of the webs so that the webs are present substantially continuously over the length of the plank particularly, the boards making up the planks are materially constrained against warping and twisting.

3. The tonguing and grooving of the planks increases the path length through joints and reduces or eliminates the passing of air through such joints. 4. The method of manufacture and apparatus therefor are capable of high rates of production thus achieving economy in manufacture. 5. The groove cutting part of the apparatus ensures accurate cutting of grooves which will be on opposite edges of each web facilitating fitting the webs. 6. Because the web inserting part of the apparatus operates on multiple webs again a high production rate may be maintained. 7. The web magazine has the particular advantage that it does not need any individual places for the webs since the selection of a web from the magazine is effected automatically by the hook means pulling on the nearest available web in the magazine. Since the webs are kept packed in the magazine by the pressure means 44 they are stacked one against the other in a readily available manner and the shaped nose 52 will move the webs aside in a manner such that the shoulder 53 will automatically engage an edge 54. 8. The in situ foamed insulation also enters interstices of the points between the webs and boards stiffening up the finished plank.

We claim:

1. Apparatus for use in producing insulated planks having foamed insulation between two boards held in spaced apart disposition by spaced webs therebetween, comprising:

dovetailing means for providing a plurality of spaced apart dovetail grooves in exposed surfaces of said boards, the dovetail grooves being at an angle to the longitudinal axis of the boards and being spaced apart at predetermined intervals along the length of the boards comprising, a plurality of saws or like cutting means arranged to be operated along a path to provide the dovetail grooves at said angle; clamping means adapted to clamp two boards face to face while the dovetailing operation is being carried out, one group of said saws being positioned on one side of the clamped boards and the other group being positioned on the other side of said boards; automatic indexing means for moving the boards at intervals between the cutting of one set of dovetail grooves and the cutting of a next set of dovetail grooves comprising, first and second moving means arranged so that after a traverse of said saws over said boards to cut grooves therein, the boards are moved a distance equal to the spacing between successive dovetail grooves by said first moving means and the saws reversed in traverse to cut a next group of dovetail grooves being spaced apart by the desired spacing, the boards being moved a multiple of said spacings by said second moving means so that a new cycle of movement by said first moving means can commence; means for inserting a plurality of said webs having dovetail profiled edges in said dovetail grooves when said boards are arranged spaced apart with the dovetailed grooves facing each other; means for inserting insulation comprising nozzle means arranged to inject a foamable insulating material into the spaces between said webs and said boards; and a lower resilient endless belt arranged to seal the gap between the boards at least along a lower part thereof to hold the foamable material in position during foaming thereof.

2. Apparatus as claimed in claim 1 wherein said means for inserting a plurality of webs comprises: a magazine for containing a plurality of said webs arranged side by side; web drawing means arranged to enter said magazine and select a web to draw the selected web into a pair of selected oppositely positioned dovetailed grooves in said boards; and web drawing actuating means operatively connected to said web drawing means to operate said web drawings means.

3. Apparatus as claimed in claim 2 and further comprising: clamping and moving means adapted to control the movement of the plank formed by a pair of boards and webs therebetween after each set of operations of said web drawing means.

4. Apparatus as claimed in claim 2 wherein said web drawing means comprise: a guide arranged to be guided through the dovetail grooves in said boards; and a hook arranged to engage a selected web to pull the web into position in said grooves.

5. Apparatus for use in producing insulated planks having foamed insulation between two boards held in a spaced apart disposition by spaced webs therebetween comprising: means for inserting webs in grooves in the opposed faces of the boards of the plank; means for inserting insulation comprising nozzle means arranged to inject a foamable insulating material into the spaces between said webs and said boards; a lower resilient endless belt arranged to seal the gap between the boards at least along a lower part thereof to hold the foamable material in position during foaming thereof; and means for forming complementary tongue and groove profiles on opposite longitudinal edges of said plank.

* * * * *